US012570482B2

(12) United States Patent
Lundgren

(10) Patent No.: US 12,570,482 B2
(45) Date of Patent: Mar. 10, 2026

(54) STOP DEVICE FOR A CONVEYOR SYSTEM AND A CONVEYER SYSTEM COMPRISING A STOP DEVICE

(71) Applicant: FlexLink AB, Gothenburg (SE)

(72) Inventor: Tomas Lundgren, Stenkullen (SE)

(73) Assignee: FlexLink AB, Gothenburg (SE)

( * ) Notice: Subject to any disclaimer, the term of this patent is extended or adjusted under 35 U.S.C. 154(b) by 126 days.

(21) Appl. No.: 18/567,608

(22) PCT Filed: Jun. 2, 2022

(86) PCT No.: PCT/SE2022/050536
§ 371 (c)(1),
(2) Date: Dec. 6, 2023

(87) PCT Pub. No.: WO2022/260573
PCT Pub. Date: Dec. 15, 2022

(65) Prior Publication Data
US 2024/0367919 A1      Nov. 7, 2024

(30) Foreign Application Priority Data

Jun. 8, 2021    (SE) .................................... 2150725-6

(51) Int. Cl.
*B65G 47/88*          (2006.01)
(52) U.S. Cl.
CPC ................................ *B65G 47/8823* (2013.01)
(58) Field of Classification Search
CPC . B65G 47/88; B65G 47/8815; B65G 47/8823
(Continued)

(56) References Cited

U.S. PATENT DOCUMENTS 4,184,579 A    1/1980  Edward et al.
4,662,500 A * 5/1987  Agnew .............. B65G 47/8823
                                                              198/463.4
(Continued)

FOREIGN PATENT DOCUMENTS

DE     102018124772 A1    4/2020
GB          723685 A      2/1955
(Continued)

OTHER PUBLICATIONS

International Search Report and Written Opinion for Patent Cooperation Treaty Application No. PCT/SE2022/050536 dated Dec. 15, 2022, 14 pages.
(Continued)

*Primary Examiner* — Douglas A Hess
(74) *Attorney, Agent, or Firm* — Alston & Bird LLP

(57)                    ABSTRACT
Stop device (1) for a conveyor system (40) where objects (43) are conveyed on a conveyor (41), where the stop device (1) comprises a housing (2), an actuator element (3) having a stop surface (12), and an electric motor (4) operably connected to the actuator element (3) such that the electric motor (4) can control the position of the actuator element (3), where the stop device comprises a stop position (20) in which the stop device (1) will hold an object (43) in a fixed position by the stop surface (12), and a bypass position (22) in which the stop surface (12) is positioned outside of a contact plane (42; 96) of the object (43) such that the object (43) can pass the stop device (1), where the actuator element (3) is provided with a braking surface (13), where the stop device (1) comprises a braking position (21) in which the braking surface (13) is positioned in the contact plane (42; 96) such that the object (43) will bear against the braking surface (13) and such that the speed of an object (43) will slow down from a first speed to a standstill, and where the electric motor (4) can move the actuator element (3)
(Continued)

between the stop position (20), the braking position (21) and the bypass position (22). The advantage of the invention is that a reliable and cost-effective stop device comprising a brake function for an object such as a product or a pallet conveyed in a conveyor system is provided. The application also includes a conveyor system comprising a stop device.

14 Claims, 10 Drawing Sheets

(58) Field of Classification Search
USPC ...................................... 193/35 A; 198/459.6
See application file for complete search history.

(56) References Cited

U.S. PATENT DOCUMENTS

| | | | | |
|---|---|---|---|---|
| 6,213,285 | B1 * | 4/2001 | Smith .................... | B65G 47/32 |
| | | | | 198/465.1 |
| 6,220,418 | B1 * | 4/2001 | Moradians ......... | B65G 47/8823 |
| | | | | 193/35 A |
| 7,111,721 | B1 * | 9/2006 | Turner ............... | B65G 47/8823 |
| | | | | 198/463.4 |
| 7,380,649 | B2 * | 6/2008 | Lauyans ............ | B65G 47/8823 |
| | | | | 193/35 A |
| 7,513,355 | B2 * | 4/2009 | Unterhuber ........ | B65G 47/8823 |
| | | | | 193/35 A |
| 7,938,246 | B2 * | 5/2011 | Lindemann ........ | B65G 47/8823 |
| | | | | 193/35 A |
| 8,770,383 | B2 * | 7/2014 | Matsumoto ............ | B65G 47/29 |
| | | | | 198/463.4 |
| 9,090,407 | B2 * | 7/2015 | Matsumoto ............ | B65G 43/00 |
| 10,988,325 | B2 * | 4/2021 | Lundberg ........... | B65G 47/8884 |

FOREIGN PATENT DOCUMENTS

| | | | |
|---|---|---|---|
| JP | H 0616233 A | 1/1994 | |
| JP | H0664744 A | 3/1994 | |
| WO | WO 2019/070180 A1 | 4/2019 | |
| WO | WO-2022260573 A1 * | 12/2022 | ......... B65G 47/8823 |

OTHER PUBLICATIONS

Japanese Office Action for Application No. 2023-572637, dated Jan. 30, 2026, 12 pages.

* cited by examiner

STOP DEVICE FOR A CONVEYOR SYSTEM AND A CONVEYER SYSTEM COMPRISING A STOP DEVICE

CROSS REFERENCE TO RELATED APPLICATIONS

This application is a National Stage Application, filed under 35 U.S.C. § 371, of International Application No. PCT/SE2022/050536, filed Jun. 2, 2022, which international application claims priority to and the benefit of Swedish Application No. 2150725-6, filed Jun. 8, 2021; the contents of both of which as are hereby incorporated by reference in their entireties.

BACKGROUND

Related Field

The present invention relates to a stop device for a conveyor system comprising endless chains.

Description of Related Art

Conveying devices, such as those that are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets. A specific type of pallet is a puck, which is a round carrier adapted for smaller and more lightweight objects.

A pallet is conveyed along the conveying device, which comprises different work stations. At a work station, the pallet will be stopped by a stop member such that the operation may be performed on the transported object. In some cases, the object may pass a specific work station without an operation being performed on the object. The stop member is for this reason arranged to either stop the pallet or to let the pallet pass the work station.

If the conveying device is of a conventional type, in which all work stations are positioned after each other and the operations on the objects are performed synchronous, every pallet will stop at each work station. If no operation is to be performed on an object at a specific work station, the object will have to wait until the operation on the previous object at that work station is ready, until the object can continue. All pallets are in this case released at the same time and moves at the same time. One advantage of such a system is that it is easy to predict the performance of the system. One disadvantage of such a system is that it is not very flexible. If the operation time at a work station is long, all objects will have to wait that time, even if there is no operation performed on all objects. Thus, such systems are mostly used for a single product or when the differences in the products are small.

A stop device is positioned at the work station, where the pallet is to be stopped. For smaller or lighter pallets, or for some types of products, a stop device that stops the pallet directly without any damping function or means to slow down the pallet may work fine. For heavier pallets or objects, a damper means may be integrated in the pallet that will reduce the impact on the pallet from the stop device. For pallets conveying heavy objects, from 10 kg up to over 100 kg and more, a damping means integrated in the pallet may not be enough to reduce the impact on the pallet from the stop member. It is thus of advantage to provide the stop member with a damping function, adapted to slow down the speed of the pallet from the travelled speed to a standstill. In some cases, it is important that the stop position of the pallet is well-defined. The stop member should for this reason be able to damp the travel of the pallet, i.e. to reduce the speed of the pallet in a controlled way, and at the same time provide an exact and well-defined stop position. Resilient members are for this reason not practical.

Most stop members comprise a damper element adapted for a specific weight of the pallet. This type of damper element will perform well for a system comprising pallets that convey the same product all the time. For a system where the pallets convey different products with different weights, the system is not optimal. If the conveyed products are the same for a longer period, the damper element may be adjusted manually, but in a system where different products are conveyed at the same time, some products may be exposed to excessive forces or will not arrive at the exact position due to the wrong properties of the damper element.

JPH 0616233 A discloses a stop device adapted to stop a conveyed article without giving a shock to the conveyed article. The stop device comprises an articulated arm that can be raised to position a stopper arm in a position where roller arranged on the stopper arm extends into the pallet path. The stop device comprises a shock absorber adapted to reduce the speed of the conveyed article. The stopper arm allows conveyed articles from the opposite direction to pass the stop device freely, even if the stopper arm is raised. Due to the shock absorber, the stop position of the stop device is not well defined and is dependent on the weight and/or the speed of the pallet. This solution is further complicated and comprises many components.

WO 2019/070180 A1 discloses a stop device for a conveyor system that is provided with a stop position in which a pallet can be stopped and held in a fixed position, and a bypass position in which a pallet can pass the stop device. The stop device comprises a brake function that will slow down a pallet when the stop device is in the stop position before the pallet is held in the fixed position by the stop device. The brake function consists of as pivot element and a damper element, where the pallet will bear on the pivot element for a while until the pivot element and the damper element has been pushed down sufficiently for the pallet to reach the stop surface of the stop device. In this solution, the damper element must be replaced in order to adapt the stop device for pallets of different weights.

U.S. Pat. No. 4,184,579 A discloses a stop device for a conveyor that can bypass an object or stop and release an object. The stop device does not have a braking function.

There is thus room for an improved stop device.

BRIEF SUMMARY

An object of the invention is therefore to provide an improved stop device comprising a braking function for a conveyor system. Another object of the invention is to provide a conveyor system comprising at least one stop device.

The solution to the problem according to the invention is described in the characterizing part of claim 1. Claim 13 contains an advantageous conveyor system. The other claims contain advantageous embodiments and further developments of the stop device and the conveyor system.

In a stop device for a conveyor system where objects are conveyed on a conveyor, where the stop device comprises a housing, an actuator element having a stop surface, and an electric motor operably connected to the actuator element such that the electric motor can control the position of the actuator element, where the stop device comprises a stop position in which the stop device will hold an object in a fixed position by the stop surface, and a bypass position in which the stop surface is positioned outside of a contact plane of the object such that the object can pass the stop device, the object of the invention is achieved in that the actuator element is provided with a braking surface, and that the stop device comprises a braking position in which the braking surface is positioned in the contact plane such that the object will bear against the braking surface and such that the speed of an object will slow down from a first speed to a standstill, and where the electric motor can move the actuator element between the stop position, the braking position and the bypass position.

By this first embodiment of the stop device according to the invention, a stop device that can slow down an object to a standstill or a low speed before it is stopped is provided. The object may be either a pallet carrying a product or a product that is conveyed by itself on a conveyor chain. With such a stop device, the stop device can lower the speed of an object and thus reduce the impact force from the object on the stop device before the object is stopped by the stop device. This is especially advantageous for heavy pallets conveying heavy objects. This will also lower the impact force acting on the product carried by the pallet.

The stop device is provided with a stop position, a braking position and a bypass position. In the stop position, the stop device will hold an object in a fixed predefined position. In the braking position, the stop device will be able to brake an object that arrives at the stop device before the object is stopped. When an object arrives at the stop device, the object will hit a braking surface of the actuator element of the stop device. The object will glide against the inclined braking surface and the friction between the actuator element and the object will reduce the speed. The actuator element is operated by an electric motor and the motor can adapt the first contact point of the braking surface where the pallet hits the braking surface to the weight of the object. The first contact point can be adjusted between a forward contact point and a rear contact point on the braking surface. Thus, the stiffness of the stop device can be controlled such that an object regardless of weight can be brought to a standstill before the object reaches the stop position. The impact on the stop device by the object will thus be minimized, and the impact on the object itself is also reduced. When an object is to be released from the stop device, or when an object should not be stopped at all, the stop device will be set to the bypass position.

The stop device comprises an electric motor provided with a transmission having a reduction gear in order to reduce the rotational speed of the motor. The reduction gear may e.g. be a self-locking worm gear. The motor will move the actuator element between the stop position, the braking positon and the bypass position by rotating an axle that affects the position of the actuator element. The electric motor further comprises a rotational sensor of some kind, such that the rotation and the rotational position of the axle can be controlled in a precise manner. The electric motor is controlled by the control system of the conveyor system.

In one example, the actuator element is mounted on an axle attachment of the axle. In this example, the electric motor controls the actuator element directly. The stop device may be positioned either vertically or horizontally, i.e. with the braking surface of the stop device in a vertical or horizontal direction. The braking surface of the actuator is aligned with the longitudinal direction of the conveyor track in the stop position. In this case, only the stop surface of the nose of the actuator element extends into the conveyor path of the object. In the braking position, the braking surface is tilted inwards towards the conveyor path, such that part of the braking surface extends into the conveyor path, with the first contact point of the braking surface positioned at a contact plane of the conveyor. An object will arrive at the tilted braking surface and will glide against the braking surface. Depending on the orientation of the stop device, the object will try to push the braking surface either to the side or downwards. At the same time, the speed of the object is decreased. The angle of the braking surface and the resisting force of the braking surface can be set in dependence of the weight of the object. Further, there is a shaft coupling arranged between the transmission and the axle. The shaft coupling comprises resilient elements that may be used to allow the actuator element to flex to some extent. The first contact point of the braking surface where the pallet hits the braking surface can be adapted to the weight of the object. The first contact point can be adjusted between a forward contact point and a rear contact point on the braking surface.

When the speed of the object is decreased to a low value or to a standstill, the motor moves the actuator element to the stop position, such that the object is held in a well-defined position by the stop surface. When the object should continue, the motor rotates the actuator element outwards from the conveyor path to the bypass position, such that the object is released.

In another example, the actuator element is mounted movable in the housing and is controlled by the motor through a pivot element mounted on the axle. The actuator element is attached to the pivot element with a pivot pin along a pivot axis. In this example, the electric motor controls the rotational angle of the pivot element, which in turn affects the height position of the actuator element. The stop device is in this example preferably positioned horizontally, i.e. with the braking surface of the stop device in a horizontal direction. In this way, the weight of the object is only acting on the braking surface, and not on the guide rails. The braking surface of the actuator is aligned with the longitudinal direction of the conveyor track in the stop position. In this case, only the stop surface of the nose of the actuator element extends into the conveyor path of the object. In the braking position, the braking surface is tilted upwards towards the conveyor path, such that part of the braking surface extends into the conveyor path and such that the first contact point of the braking surface is positioned at the contact plane. An object will arrive at the tilted braking surface and will slide forwards and slightly upwards on the braking surface. At the same time, the speed of the object is decreased.

In the braking position, the pivot element is arranged substantially vertical, such that the force from the object will act substantially towards the centre of the axle. This will give a rigid solution for the braking surface, and the braking surface will not flex. Instead, the object will glide up on the braking surface until it stops. At the same time, the front part of the object will lose contact with the conveyor track and will thus loose traction force. The height of the braking surface can be set in dependence of the weight of the object. When the speed of the object is decreased to a low value or to a standstill, the motor moves the actuator element to the stop position, such that the object is held in a well-defined position. When the object should continue, the motor rotates the pivot element such that the actuator element is lowered out of the conveyor path to the bypass position, such that the object is released.

The stop device is mounted to a conveyor beam with T-slot nuts. This example of a stop device is mainly intended for heavy-duty conveyor systems comprising accumulation chains as conveying means. In such conveyor systems, an accumulation chain is arranged on each side of the conveyor. The accumulation chains are moved forwards on the conveyor beams, and the object bears on the transport rollers of the accumulation chain and is in this manner conveyed forwards by the transport rollers. This type of conveyor is thus adapted for heavy loads of up to 100 kg and more. The stop device is arranged in a position where an object will be able to interact with the stop device. A conveyor system may use one or two stop devices to stop an object.

BRIEF DESCRIPTION OF DRAWINGS

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use, conveying objects in a horizontal plane. The stop device is adapted to stop various objects that are conveyed by a conveyor chain. An object may be either a pallet or puck carrying a product or a rigid product that is conveyed by itself on a conveyor chain. In the described examples, a pallet will be used as an example of an object.

FIGS. 1 to 4d show a first example of a stop device 1 according to the invention, and FIGS. 5 to 8d show a second example of a stop device according to the invention. The stop device of the first example is primarily intended to be used in conveyor systems conveying objects on a chain conveyor. One example of the stop device is mainly adapted for heavy objects, where a loaded pallet may weigh up to 100 kg and more, where the pallet is conveyed by the use of accumulation chains, and where the conveyor system comprises two conveyor beams arranged at each side of the conveyor, each comprising an accumulation chain. In this example, the stop device is mounted below the transport plane of the conveyor, between the conveyor beams. An empty pallet may in this example weigh around 20 kg. In the second example of the stop device, the stop device is mounted on the side of the conveyor, outside of a pallet contact plane. This example is mainly adapted for lighter objects conveyed by a pallet on a chain conveyor comprising interconnected plastic chain links, even though it could also be used for heavy pallets conveyed by roller chains.

Figure 1:
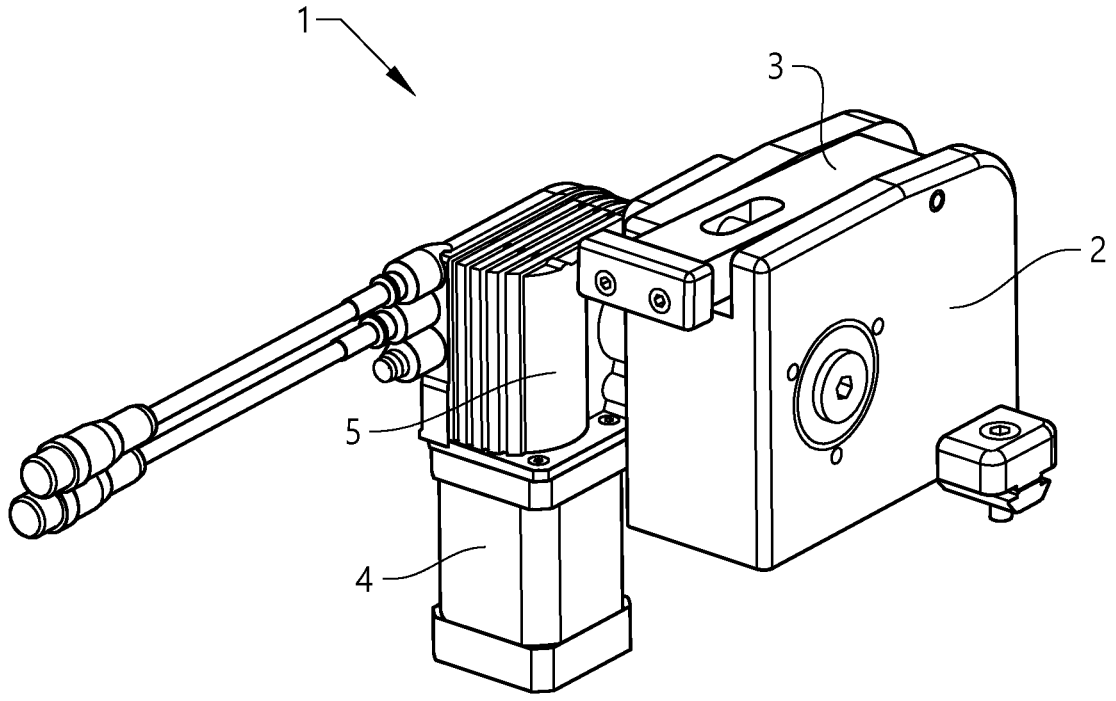
FIG. 1 shows a first example of a stop device according to the invention.
Figure 2:
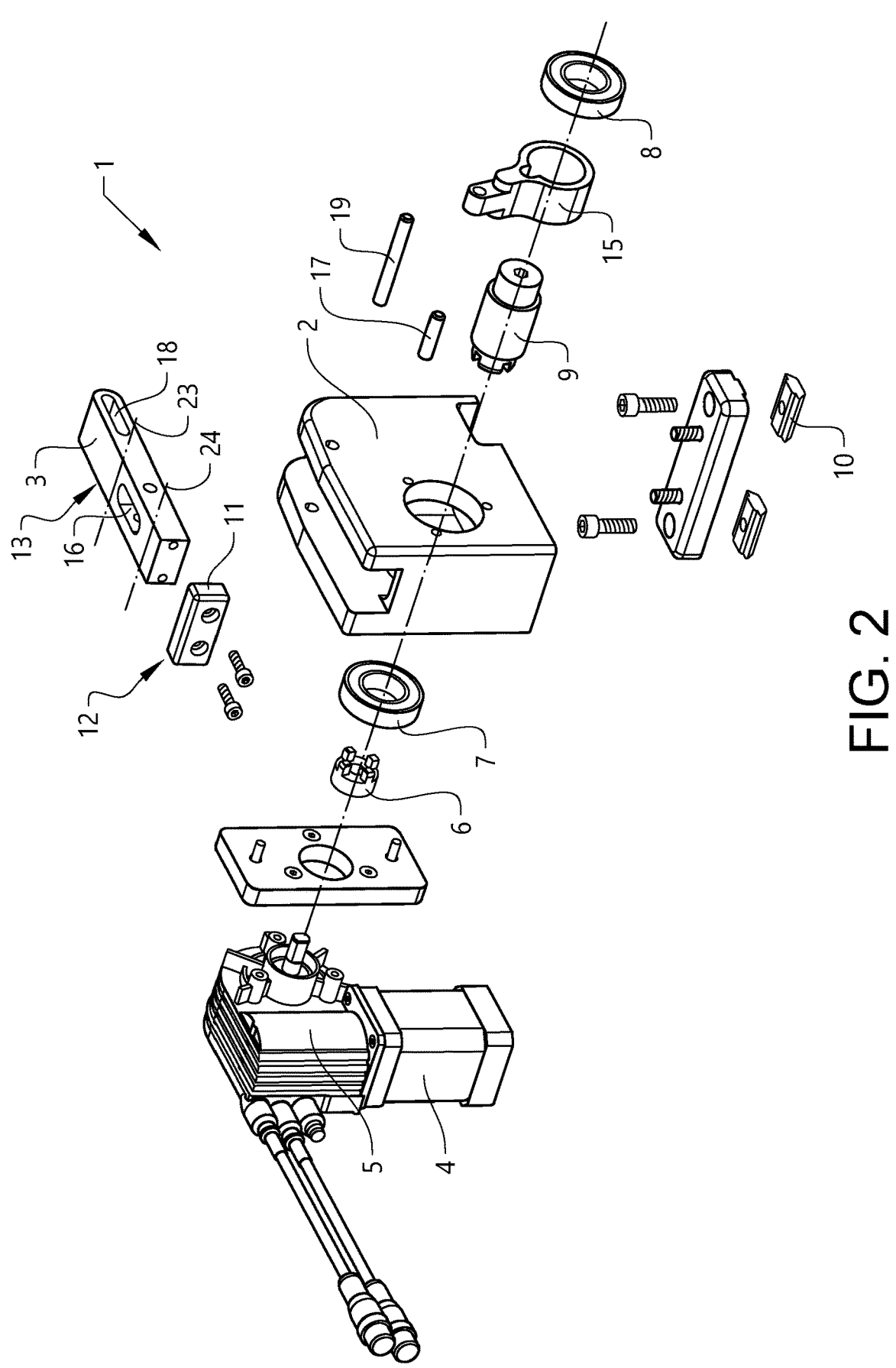
FIG. 2 shows an exploded view of the stop device of FIG. 1.

FIGS. 1 and 2 show a stop device 1 comprising a housing 2 having two parallel outer side walls and with an actuator element 3 arranged between the side walls. The actuator element 3 is controlled by a drive unit comprising an electric motor 4 and a transmission 5. The electric motor is a rotating motor, e.g. a DC motor or a stepper motor. The motor is preferably provided with a rotational sensor of some type to be used for feedback purposes. The transmission is provided with a reduction gear in order to reduce the rotational speed of the motor and to increase the load properties. The reduction gear may be a straight transmission or, as shown, a worm gear. Preferably, a self-locking worm gear is used. It would also be possible to control the actuator element with a linear electric actuator. The stop device is attached to a channel of a conveyor beam with T-slot nuts 10. In this way, it is easy to position the stop device in a desired position. When one stop device is used, the stop device will be positioned at the centre of the conveyor, between the conveyor beams. For heavier pallets, it is possible to use two stop devices mounted close to each conveyor beam of the conveyor. This stop device may also be used for square objects, such as boxes, that are conveyed by accumulation chains.

Figure 3:
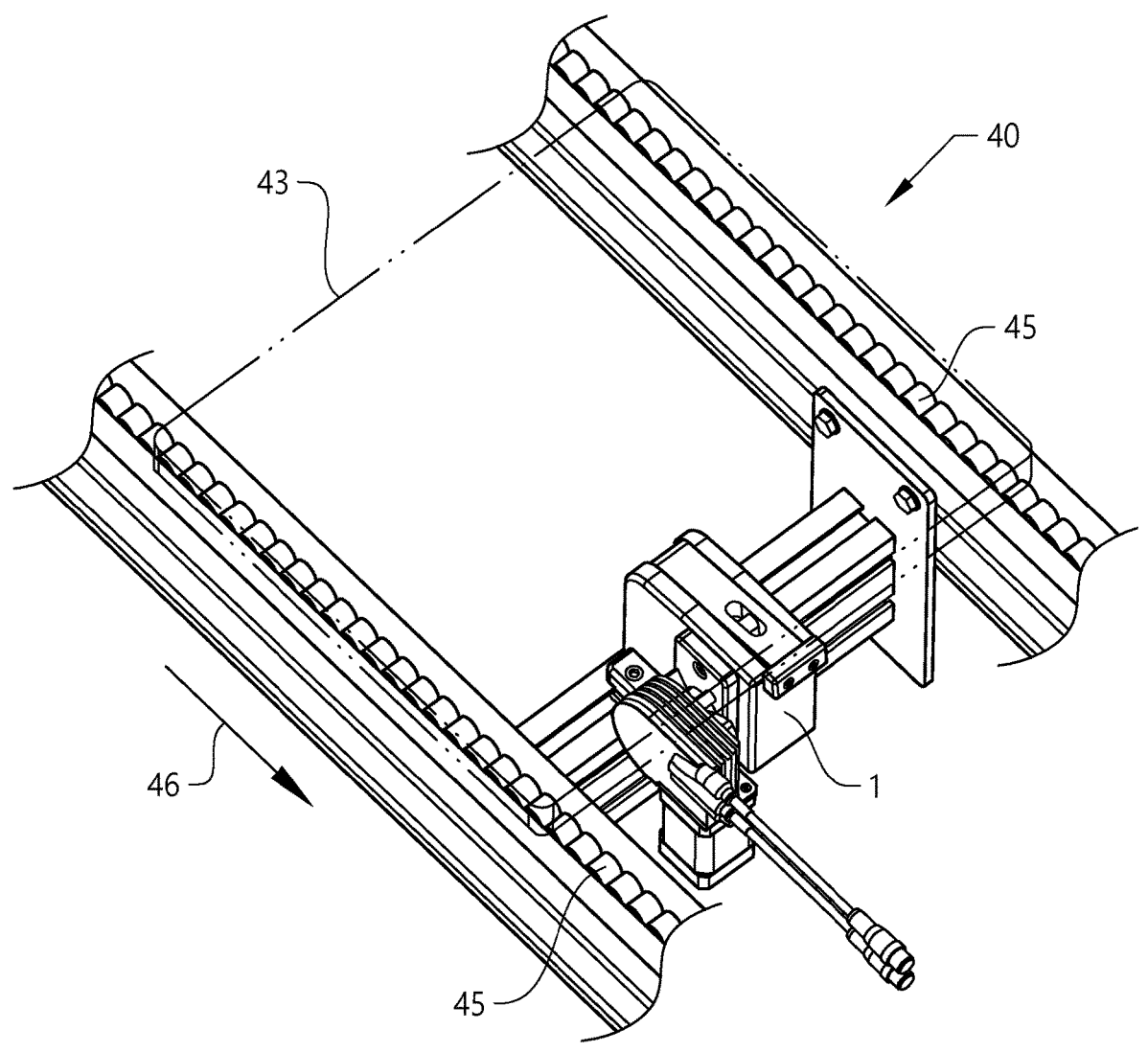
FIG. 3 shows the stop device of FIG. 1 arranged at a conveyor beam.

FIG. 3 shows a stop device mounted between two conveyor beams in a conveyor system 40, e.g. at a work station. The moving direction of the pallet is shown with an arrow 46. The conveyor system in the shown example comprises two parallel conveyor beams. An accumulation chain 45 is arranged in each conveyor beam. The beam supporting the stop device is attached to the two conveyor beams. The pallet is conveyed on a transport plane 42, which in this example is the contact plane for the pallet with regards to the braking surface 13.

An axle 9 is mounted to the output shaft of the transmission through a shaft coupling 6. The axle is mounted horizontally in the housing. The shaft coupling comprises resilient elements that will act as small shock absorbers and that will reduce impact forces on the transmission. The shaft is suspended in the housing with a first bearing 7 and a second bearing 8. The bearings may be roller bearings or slide bearings. A pivot element 15 is mounted on the axle 9. The pivot element comprises an arm that is attached to the actuator element 3 with a pivot pin 17. The actuator element 3 is in the shown example longitudinal with a rectangular cross section. At the front end, the actuator element 3 comprises a horizontal retention slot that secures the actuator element 3 to the housing with a retention pin 19. The retention slot allows the actuator element 3 to move back and forth in the housing. At the rear end, the actuator element 3 is provided with a nose 11 having a stop surface 12 pointing against the moving direction of an object. The stop surface is adapted to stop and hold a pallet 43 when the stop device is in a stop position 20. The nose may be integral with the actuator element 3 or may be replaceable with screws. Between the front end and the rear end, the actuator element 3 is provided with a vertical pivot slot 16 in which the pivot element 15 is mounted with the pivot pin17.

Figure 4A:
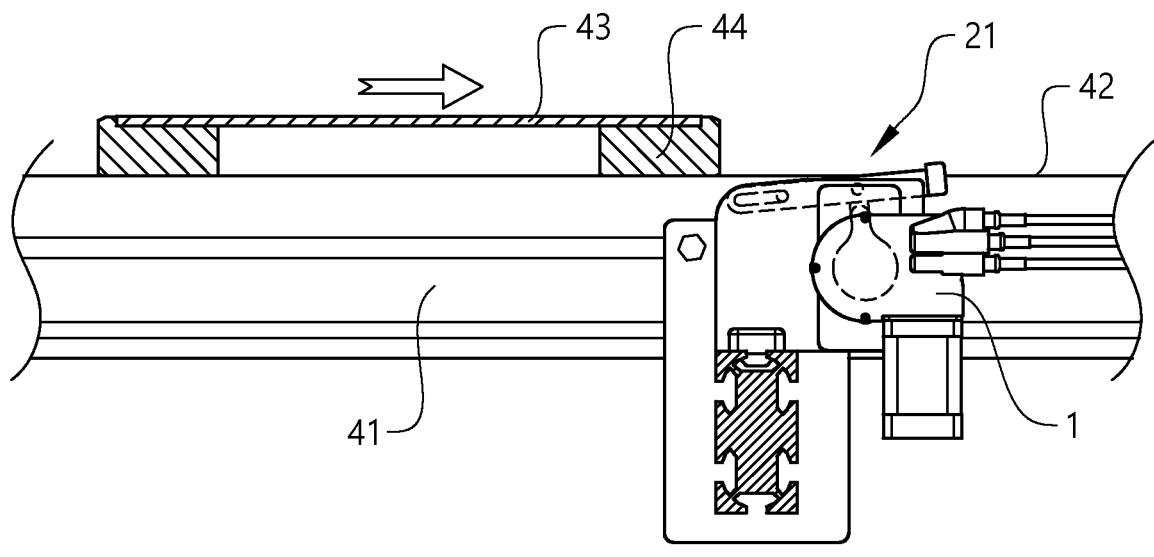
FIG. 4a shows a side view of a stop device according to the invention in a braking position.
Figure 4B:
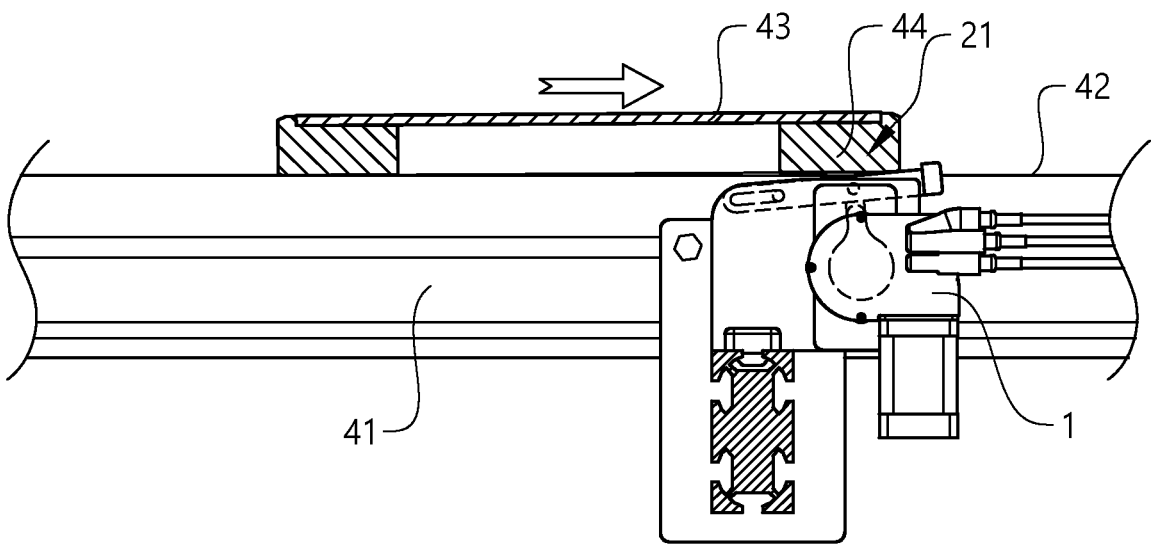
FIG. 4b shows a side view of a stop device according to the invention with a braked pallet.
Figure 4C:
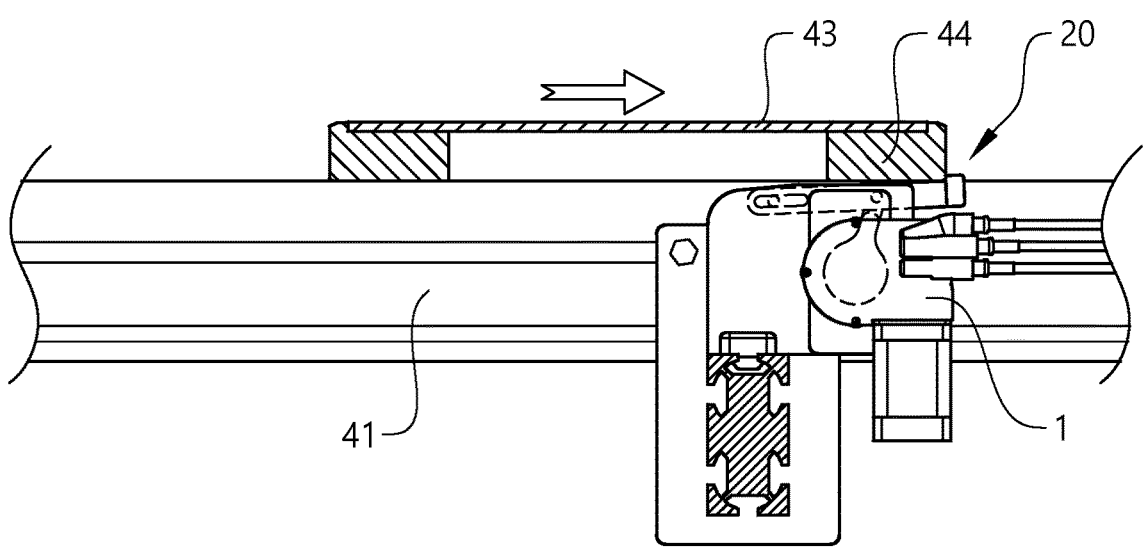
FIG. 4c shows a side view of a stop device according to the invention in a stop position.
Figure 4D:
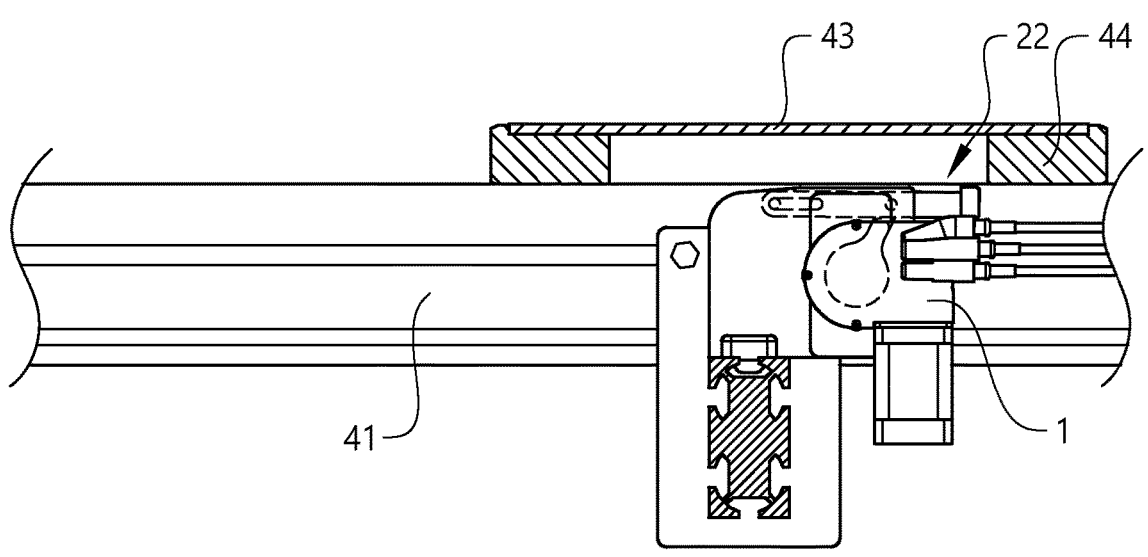
FIG. 4d shows a side view of a stop device according to the invention in a bypass position.

The upper surface of the actuator element 3 comprises a braking surface 13. The braking surface can be positioned in the transport plane of the pallet, such that the pallet or the pallet support of the pallet will arrive at a first contact point of the braking surface when the pallet is to be stopped. FIG. 4a shows the stop device 1 mounted at a conveyor in a braking position 21. The actuator element 3 will provide a brake function, which will reduce the speed of a pallet from the travelled speed to standstill. When the pallet arrives at the first contact point of the braking surface 13, it will slide on the braking surface. Since the braking surface is inclined, the front end of the pallet will move upwards and the pallet will lose speed due to friction between the braking surface and the pallet. The pallet will further loose some traction from the conveyor chain since some of the weight of the pallet is supported by the braking surface. In this way, the pallet will be braked to a standstill in a gentle manner, with the front of the pallet lifted from the conveyor by the braking surface and with only the rear of the pallet in contact with the conveyor, as shown in FIG. 4b. When the pallet has come to a standstill, the actuator element 3 can be lowered to the stop position 20 by the electric motor. The pallet will move forwards until it rests on the stop surface 12 of the actuator element 3, as shown in FIG. 4c. When the pallet is to be released from the stop position 20, the actuator element 3 is lowered completely by the electric motor to the bypass position 22, in which the nose 11 of the actuator element 3 is positioned below the transport plane 42 of the conveyor, as shown in FIG. 4d. In this position, pallets can pass the stop device without interruptions. It is of course also possible to move the actuator element 3 from the braking position 21 directly to the bypass position 22 by the electric motor, without stopping the pallet. This may be of advantage when the speed of a pallet is to be reduced, but there is no need to stop the pallet at an exact position.

The height of the actuator element 3, i.e. the angle of the braking surface 13, can be adjusted by the electric motor such that the first contact point where the pallet arrives at the braking surface can be selected. The braking surface is adjusted by rotation of the electric motor, which will adjust the position of the actuator element and thus inclination of the actuator element. The braking surface is provided with a forward contact point 23 that is used when a large braking force is required, e.g. when the speed of the object is high and/or when the weight of the object is high. The braking surface is also provided with a rear contact point 24 that is can be used when a low braking force is required. The forward contact point and the rear contact point defines the interval in which the braking position can be adjusted. For a heavy pallet, the forward contact point 23 or a contact point close to the forward contact point 23 may be used. For a light pallet, the rear contact point 24 or a contact point close to the rear contact point 24 may be used.

Any position in the interval can be used, depending on the weight of the pallet. A control unit is arranged to control the motor of the stop device, and the control unit can receive information about the weight of an incoming pallet and can adjust the braking position accordingly. The pallet may e.g. comprise an RFID-chip that carries information about the weight of the pallet, or the conveyed product comprises an RFID-chip that identifies the product.

The electric motor is controlled by the control system of the conveyor system to position the actuator element 3 of the stop device 1 in the stop position 20, the braking position 21 or the bypass position 22. The rotation of the motor will rotate the pivot element 15 that in turn adjusts the height and the inclination of the actuator element 3. At the same time, the actuator element 3 will move slightly in a longitudinal direction. The stop position of the stop device is however well defined.

Figure 5:
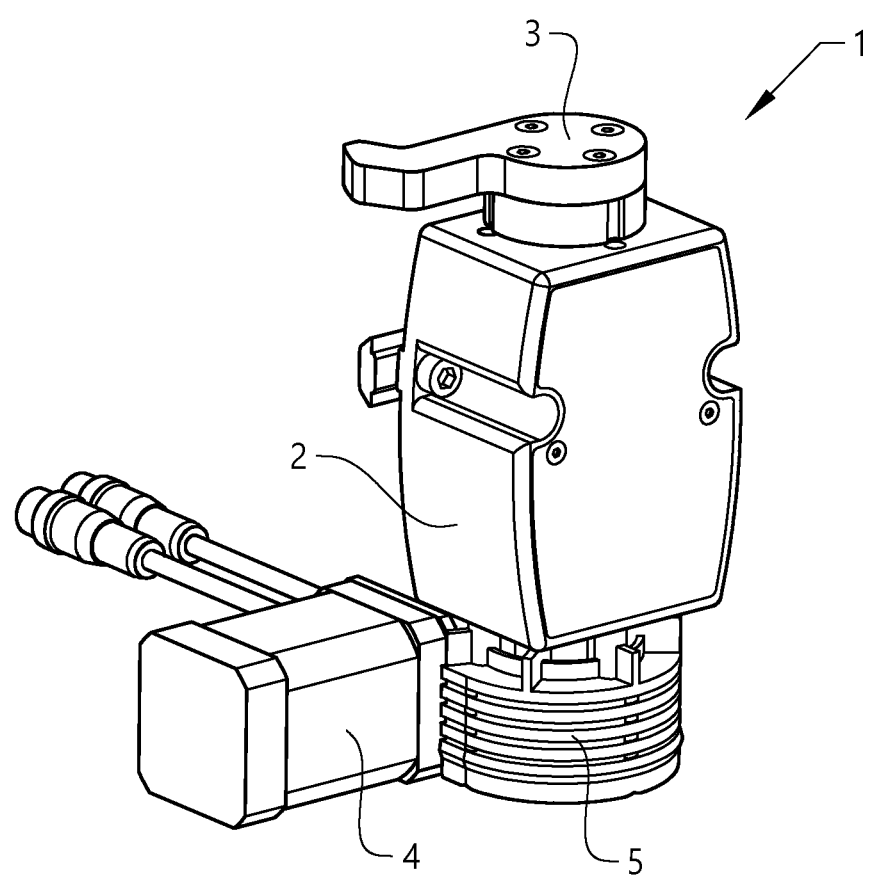
FIG. 5 shows a second example of a stop device according to the invention.
Figure 6:
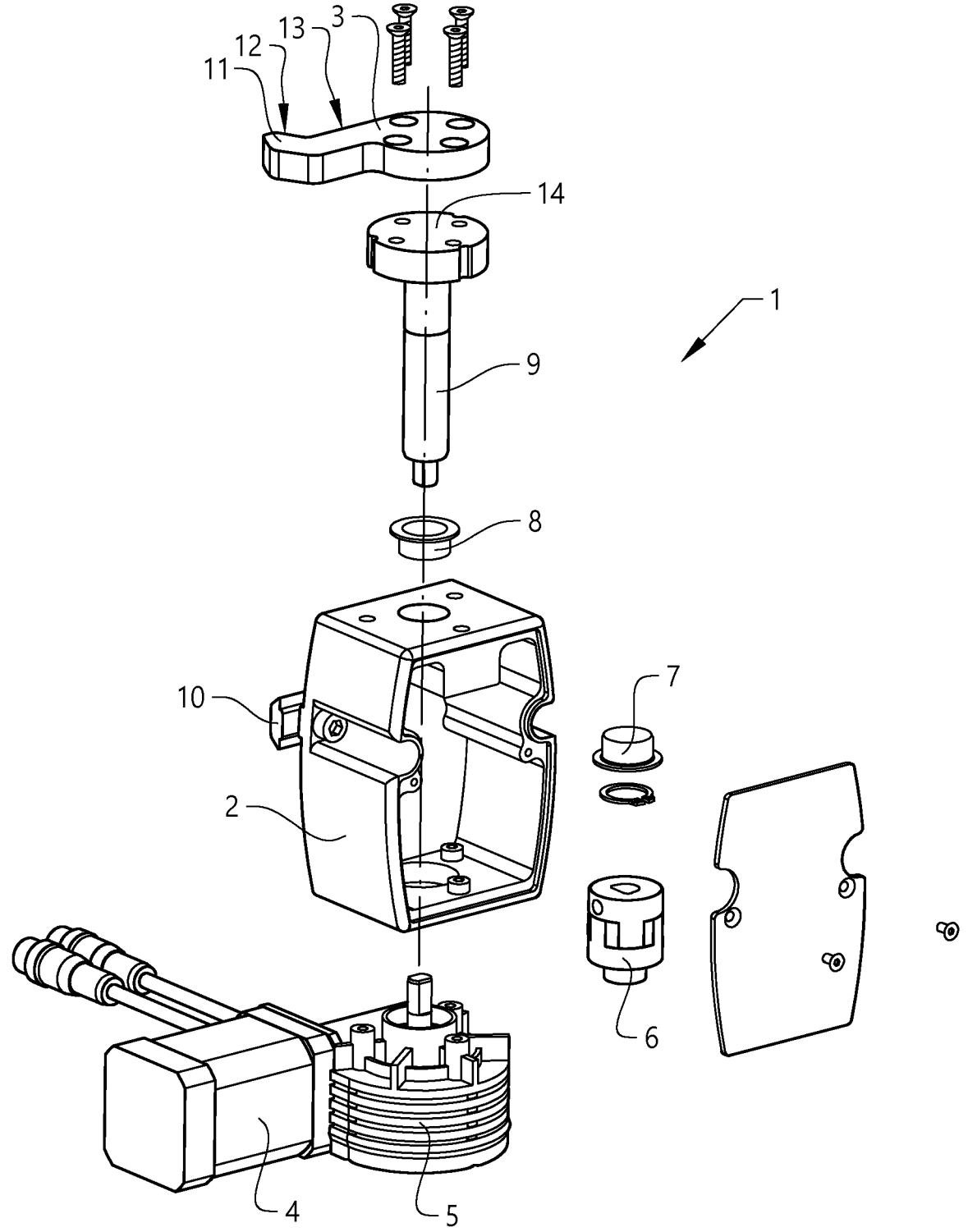
FIG. 6 shows an exploded view of the stop device of FIG. 5.
Figure 7:
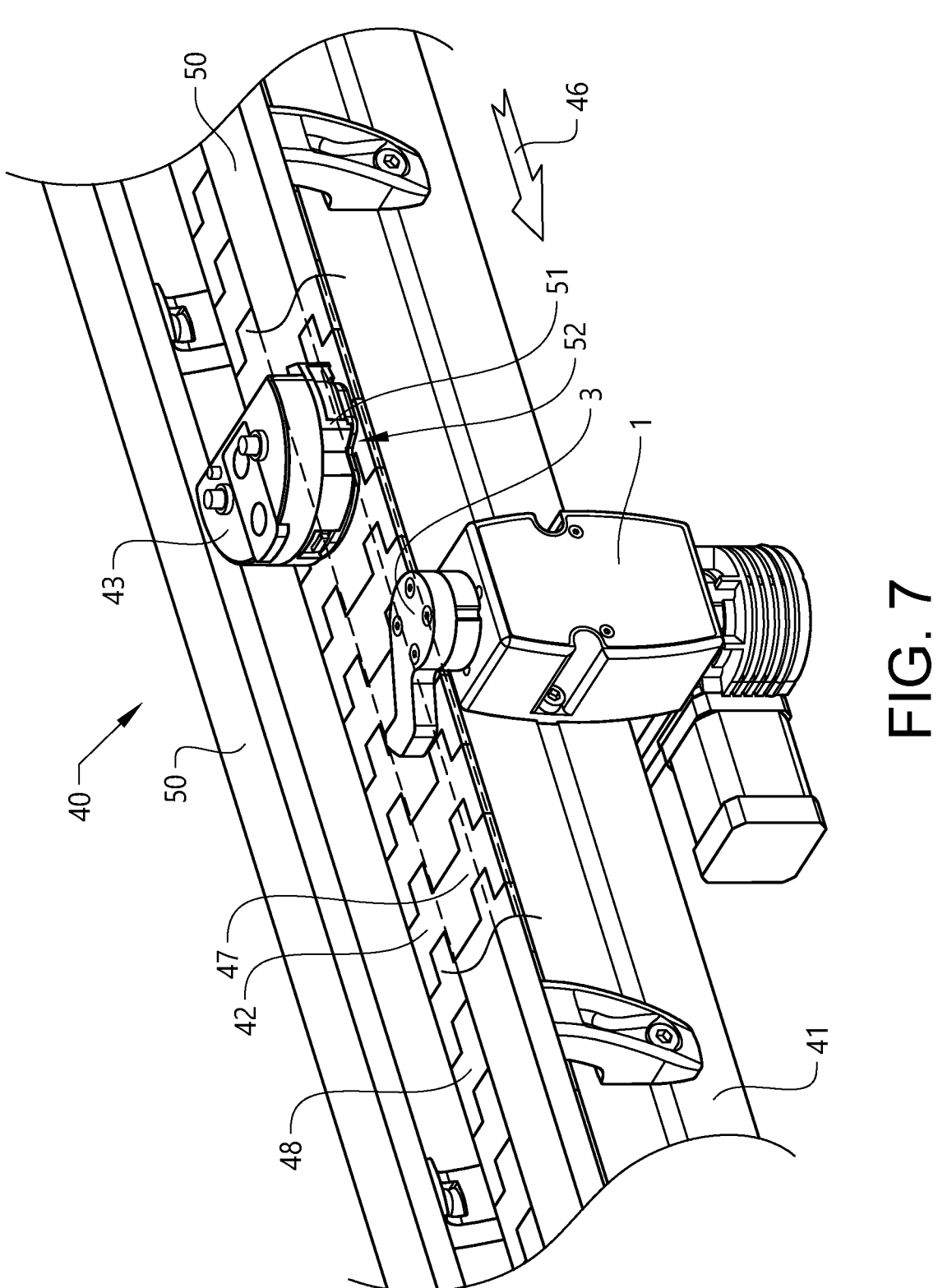
FIG. 7 shows the stop device of FIG. 5 arranged at a conveyor beam.

FIGS. 5 and 6 show another example of a stop device 1 comprising a housing 2, where the actuator element 3 is arranged at the top of the stop device. The actuator element 3 is controlled by a drive unit comprising an electric motor 4 and a transmission 5 arranged at the bottom of the stop device. The electric motor is a rotating motor, e.g. a DC motor or a stepper motor. The motor is preferably provided with a rotational sensor of some type to be used for feedback purposes. The transmission is provided with a reduction gear in order to reduce the rotational speed of the motor. The reduction gear may be a straight transmission or, as shown, a worm gear. In one example, a self-locking worm gear is used. The stop device is attached to a channel of a conveyor beam with T-slot nuts 10. In this way, it is easy to position the stop device in a desired longitudinal position. The stop device is adapted to be mounted on a side of a conveyor, with the actuator element sticking in to the conveyor path from the side. FIG. 7 shows a stop device mounted on the side of a conveyor beam in a conveyor system 40. The moving direction of the pallet is shown with an arrow 46. The conveyor system comprises guide rails 50 on each side of the conveyor path, adapted to guide and support the pallet sideways. The guide rail is arranged at a distance above the conveyor path, such that the actuator element can be positioned between the conveyor path and the guide rail. The vertical plane where the pallet bears on a guide rail is referred to as the pallet contact plane 49, which in this example is the contact plane for the pallet with regards to the braking surface 13.

An axle 9 is mounted to the output shaft of the transmission through a shaft coupling 6. The axle is mounted vertically in the housing. The shaft coupling comprises resilient elements that will act as small shock absorbers and that will reduce impact forces on the transmission. The primary purpose of the shaft coupling is to help with the alignment of the transmission axle and the axle 9, but the stiffness of the resilient material can be selected such that it also functions as a shock absorber. The shaft is suspended in the housing with a first bearing 7 and a second bearing 8. The bearings may be roller bearings or slide bearings. An axle attachment 14 is arranged on the axle 9, and is preferably integral with the axle. The actuator element 3 is mounted to the axle attachment 14 with screws. In this way, it is easy to remove the actuator element 3, either to replace it when it is worn or to replace it with another type of actuator element 3 having e.g. a different size or shape adapted for another type of pallet. The actuator element 3 in the shown example comprises an arm provided with a braking surface 13. At the rear end, the actuator element 3 is provided with a nose 11 having a stop surface 12 pointing against the moving direction of a pallet. The stop surface is adapted to stop and hold a pallet 43 when the stop device is in a stop position 20. The nose is integral with the actuator element 3. This type of stop device is also suitable for rigid objects, such as boxes, cans, roller bearings or cogwheels. The objects should be rigid and the shape of the object should preferably be circular or square. The stop surface of the actuator element can be adapted to the shape of the object.

Figure 8A:
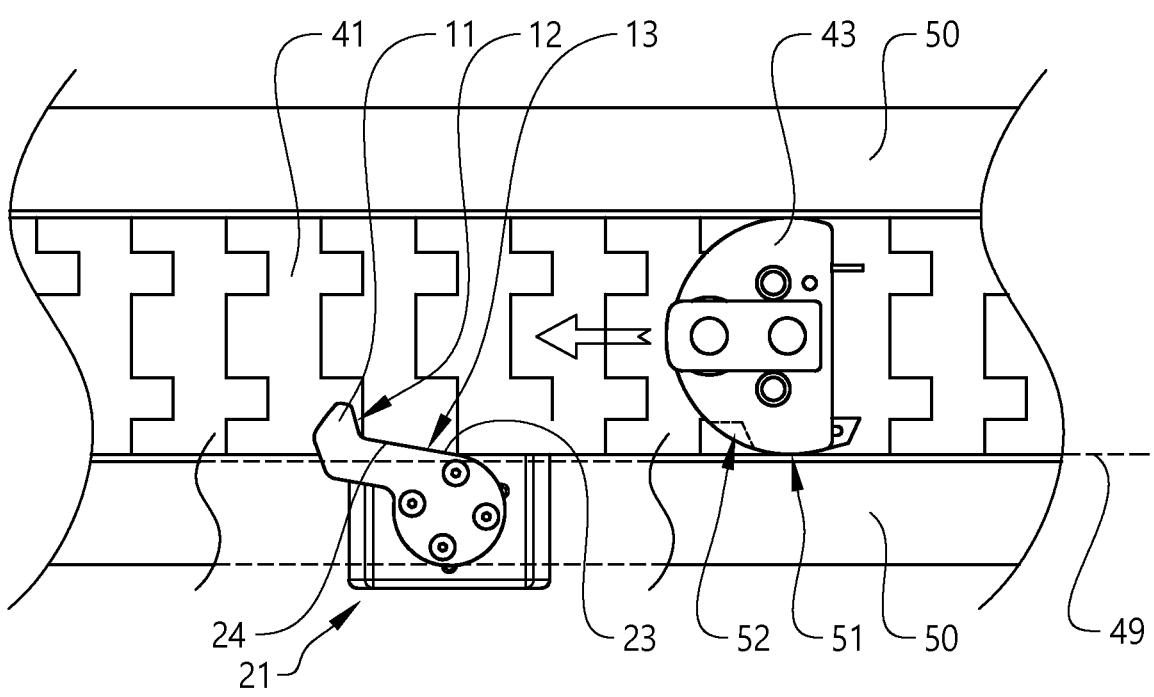
FIG. 8a shows a top view of a stop device according to the invention in a braking position.

The braking surface 13 of the actuator element 3 can be positioned in a pallet contact plane 49 of the conveyor path, such that a side surface 51 of a pallet will arrive at the braking surface when the pallet is to be stopped. The pallet contact plane 49 is the plane at which the pallet is supported by the guide rail 50. The stop device is mounted underneath the guide rail with the actuator element 3 between the guide rail and the conveyor chain support plane. FIG. 8*a* shows the stop device 1 mounted on the side of a conveyor beam in a braking position 21. The actuator element 3 will provide a brake function, which will reduce the speed of a pallet from the travelled speed to standstill. When the pallet arrives at the braking surface 13, the side surface 51 of the pallet will bear on the braking surface. Since the braking surface is inclined with respect to the pallet contact plane 49, the pallet will be squeezed between the braking surface 13 of the stop device 1 and the bearing surface of the opposite guide rail 50. The resilience of the components will allow the components to flex somewhat, which will gently bring the pallet to a standstill. This example of a stop device will function well for pallets weighing up to 15 kg and more, and having a maximum speed of up to 20 m/min.

The actuator element 3 may at the same time flex somewhat outwards, either due to the resilient material of the shaft coupling or due to the stiffness of the motor/transmission, since the pallet will push on the actuator element. The stiffness of the actuator element 3, i.e. the amount that the actuator element 3 will be able to rotate counter-clockwise, can be controlled by the motor. By applying a small hold current to the motor, the actuator element 3 is allowed to be pushed to the side somewhat by the pallet. The amount of allowed rotation is preferably set in dependence of the weight and speed of the pallet. It is also possible to allow the motor to rotate backwards for a predefined amount, which may be controlled by the rotational sensor. Since this example of a stop device is adapted for lighter pallets and products, a relatively short brake distance is sufficient. It is also possible to provide the braking surface of the actuator element 3 with a resilient surface treatment, such as layer of rubber or plastic, which will help to absorb some of the force of the pallet. It would also be possible to provide the guide rail support with a resilient element in order to increase the resilience of the guide rail at the stop device.

Figure 8B:
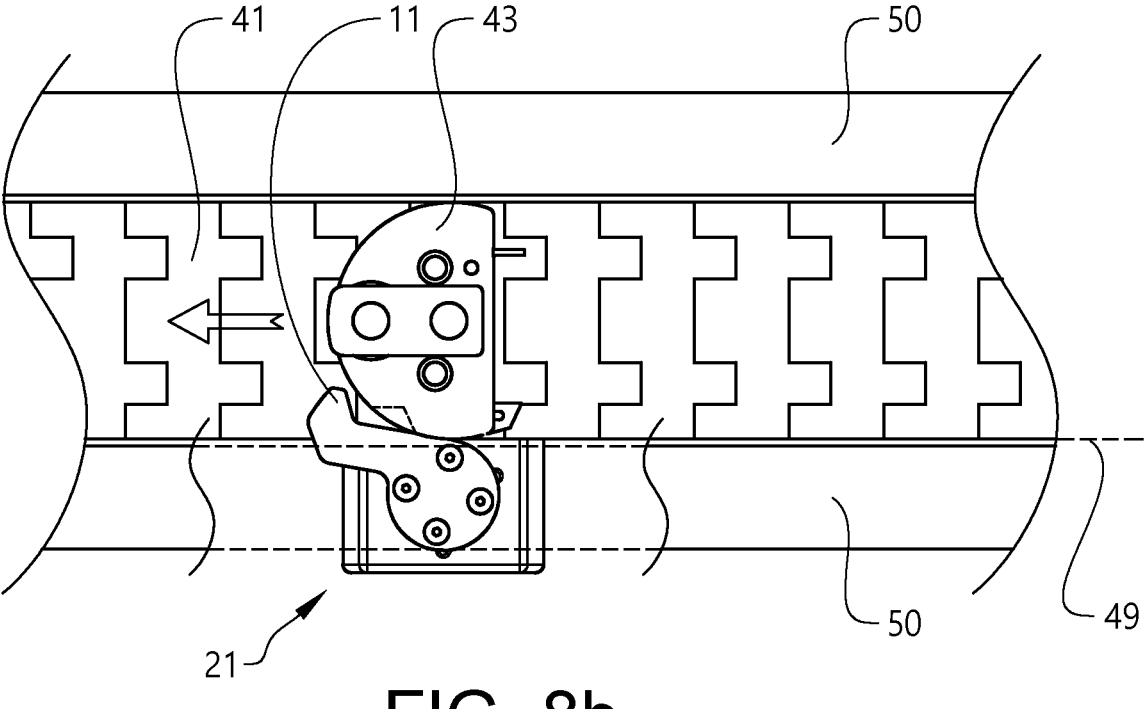
FIG. 8b shows a top view of a stop device according to the invention with a braked pallet.
Figure 8C:
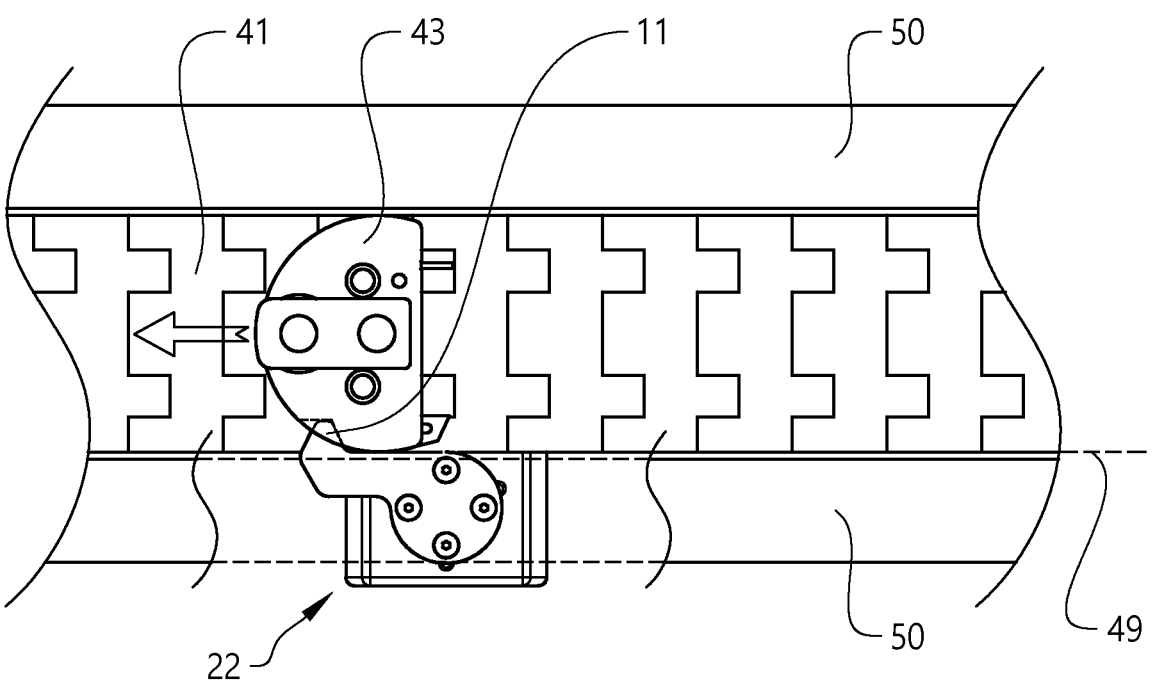
FIG. 8c shows a top view of a stop device according to the invention in a stop position.
Figure 8D:
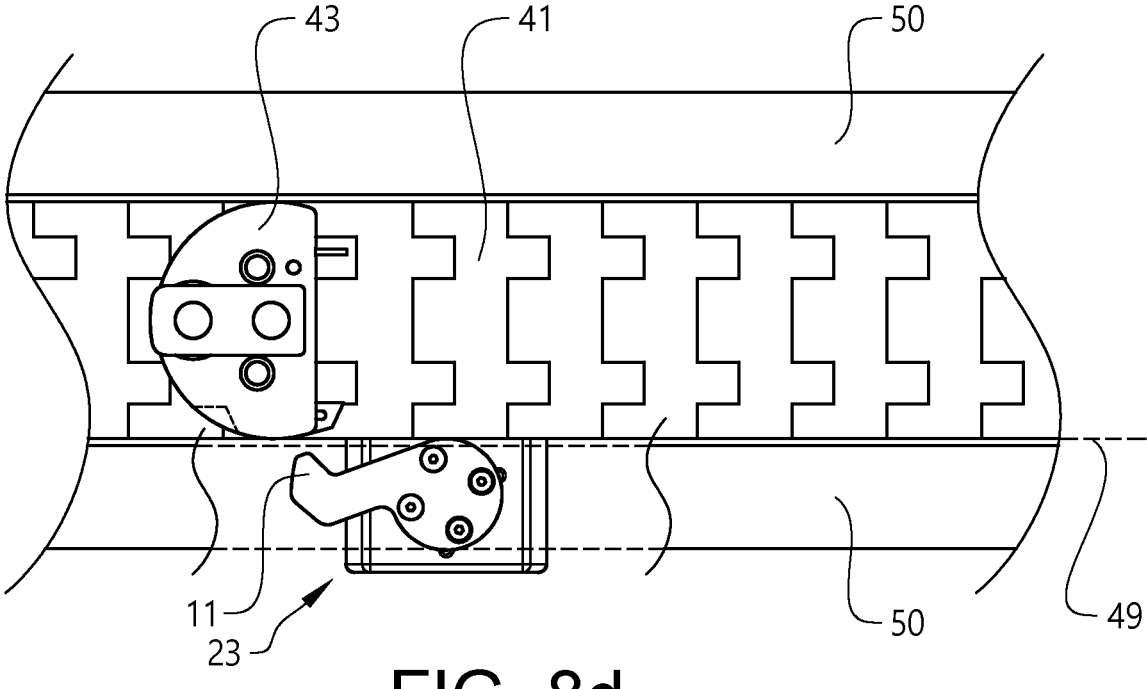
FIG. 8d shows a top view of a stop device according to the invention in a bypass position.

In this way, the pallet will be slowed down to a standstill in a gentle manner, with the side surface of the pallet bearing on the braking surface 13, as shown in FIG. 8*b*. When the pallet has come to a standstill, the actuator element 3 can be rotated counter-clockwise to the stop position 22. The pallet will move forwards until it rests on the stop surface 12 of the actuator element 3, as shown in FIG. 8*c*. In the shown example, the pallet is provided with a stop recess 51 having a shape that corresponds to the stop surface of the actuator element 3. This will provide a well-defined stop position for the pallet. When the pallet is to be released from the stop position 20, the actuator element 3 is rotated further counter-clockwise until the nose 11 of the actuator element 3 is positioned outside of the pallet contact plane 49 of the conveyor, as shown in FIG. 8*d*. In this position, pallets can pass the stop device without interruptions. It is also possible to move the actuator element 3 from the braking position 21 directly to the bypass position 22, without stopping the pallet. This may be of advantage when the speed of a pallet is to be reduced, but there is no need to stop the pallet at an exact position.

The angle of the braking surface 13 relative the pallet contact plane 49 can be adjusted by the electric motor such that the first contact point where the pallet arrives at the braking surface can be selected. The braking surface is provided with a forward contact point 23 and a rear contact point 24. The forward contact point and the rear contact point defines the interval in which the braking position can be adjusted. For a heavier pallet, the forward contact point 23 or a contact point close to the forward contact point 23 may be used. For a lighter pallet, the rear contact point 24 or a contact point close to the rear contact point 24 may be used. Any position in the interval can be used, depending on the weight and/or speed of the pallet. A control unit is arranged to control the electric motor of the stop device, and the control unit can receive information about an incoming pallet and adjust the stop position accordingly. The pallet may e.g. comprise an RFID-chip that carries information about the weight of the pallet, or the conveyed product comprises an RFID-chip that identifies the product.

The electric motor is controlled by the control system of the conveyor system to position the actuator element 3 of the stop device 1 in the stop position 20, the braking position 21 or the bypass position 22. The rotation of the motor will rotate the actuator element 3.

The invention is not to be regarded as being limited to the embodiments described above, a number of additional variants and modifications being possible within the scope of the subsequent patent claims. The stop device may have any size and may be made from any suitable material.

REFERENCE SIGNS

1: Stop device
2: Housing
3: Actuator element
4: Electric motor
5: Transmission
6: Shaft coupling
7: First bearing
8: Second bearing
9: Axle
10: T-slot nut
11: Nose
12: Stop surface
13: Braking surface
14: Axle attachment
15: Pivot element
16: Pivot slot
17: Pivot pin
18: Retention slot
19: Retention pin
20: Stop position
21: Braking position
22: Bypass position
23: Forward contact point
24: Rear contact point
40: Conveyor system
41: Conveyor
42: Transport plane
43: Pallet
44: Pallet support member
45: Roller chain
46: Moving direction
47: Endless chain 48: Chain link
49: Pallet contact plane
50: Guide rail
51: Pallet side surface
52: Pallet stop recess

The invention claimed is:

1. Stop device (1) for a conveyor system (40) where objects (43) are conveyed on a conveyor (41), the stop device (1) comprising:

a housing (2), an actuator element (3) having a stop surface (12), an electric motor (4) operably connected to the actuator element (3) such that the electric motor (4) can control the position of the actuator element (3), a stop position (20) in which the stop device (1) will hold an object (43) in a fixed position by the stop surface (12), and a bypass position (22) in which the stop surface (12) is positioned outside of a contact plane (42; 96) of the object (43) such that the object (43) can pass the stop device (1), wherein:

the actuator element (3) is provided with a braking surface (13), the stop device (1) further comprises a braking position (21) in which the braking surface (13) is positioned in the contact plane (42; 96) of the object (43), such that the object (43) will bear against the braking surface (13) and such that the speed of an object (43) will slow down from a first speed to a standstill, the electric motor (4) can move the actuator element (3) between the stop position (20), the braking position (21) and the bypass position (22), and the actuator element (3) is connected to the electric motor (4) through an axle (9) suspended in the housing (2) by a first bearing (7) and a second bearing (8).

2. Stop device according to claim 1, wherein the braking surface (13) can be fine adjusted by the electric motor (4) in the braking position (21) between a forward contact point (23) and a rear contact point (24).

3. Stop device according to claim 2, wherein the braking surface (13) is adjusted in the braking position (21) depending on the weight of an object (43) that is to be stopped.

4. Stop device according to claim 2, wherein the braking surface (13) is adjusted in the braking position (21) depending on the speed of an object (43) that is to be stopped.

5. Stop device according to claim 1, wherein the braking surface (13) of the stop device (1) is arranged to be positioned in a horizontal direction at a conveyor.

6. Stop device according to claim 5, wherein the actuator element (3) is connected to the electric motor (4) through a pivot element (15) arranged on the axle (9) and that the actuator element (3) is attached to the pivot element with a pivot pin (17) through a pivot slot (16).

7. Stop device according to claim 5, wherein the actuator element (3) comprises a retention slot (18) arranged at a front end of the actuator element (3), and that a retention pin (19) attaches the actuator element (3) to the housing (2).

8. Stop device according to claim 5, wherein the stop surface (12) of the actuator element (3) is arranged at the rear part of the actuator element (3).

9. Stop device according to claim 1, wherein the braking surface (13) of the stop device (1) is arranged to be positioned in a vertical direction at a conveyor.

10. Stop device according to claim 9, wherein the actuator element (3) is attached to an axle attachment (14) arranged on the axle (9).

11. Stop device according to claim 9, wherein the stiffness of the stop device (1) is controlled by the electric motor (4).

12. Conveyor system (40) for conveying objects (43) on a transport plane (42), the conveyor system (40) comprising:

a conveyor (41);

at least one conveyor chain (45), and at least one stop device (1) according to claim 1.

13. Conveyor system according to claim 12, wherein the stop device (1) is mounted under the transport plane (42) where the braking surface (13) of the actuator element (3) is horizontal when the stop device is in the bypass position (22).

14. Conveyor system according to claim 12, wherein the stop device (1) is mounted at the side of the conveyor chain (47) of the conveyor, where the braking surface (13) of the actuator element (3) is arranged in a vertical direction.

* * * * *